Patented May 13, 1941

2,241,801

UNITED STATES PATENT OFFICE 2,241,801

RETARDER OF VULCANIZATION

Robert V. Yohe, Cuyahoga Falls, and Arthur W. Browne, Akron, Ohio, assignors to The B. F. Goodrich Company, New York, N. Y., a corporation of New York No Drawing. Application December 4, 1937, Serial No. 178,109

4 Claims. (Cl. 260—41)

This invention relates to the vulcanization of polymerized halogenated butadienes, and particularly to the vulcanization of the polymerized chlor-2-butadiene-1,3 known as neoprene.

It is well known that polymerized halogen-2-butadiene-1,3 may be vulcanized by heating in the presence of certain metallic oxides with or without sulfur. Very great care must be exercised, however, because the vulcanization takes place so readily at low temperatures that the compositions often "scorch" or prevulcanize while they are being milled, calendered, or extruded, thereby causing great loss of time and material. This uncontrollability has resulted in a search for materials which will retard the vulcanization so that the compositions may be processed with little difficulty and still give good cures in reasonable times at curing temperatures.

We have discovered that metallic salts of the oxyacids of the class of elements consisting of boron, silicon, and phosphorus retard the vulcanization of polymerized halogen-2-butadiene-1,3 at processing temperatures and permit excellent cures under ordinary curing conditions, in 45 minutes at 287° F. for instance. The alkali metal and alkaline earth metals form particularly good retarders. The salts of other metals such as cadmium, magnesium, zinc and lead may also be used. Suitable compounds include sodium silicate, trisodium phosphate, sodium borate, calcium borate, magnesium phosphate, etc.

The retarders may be used in proportions varying from about 1 to 10 parts by weight to 100 parts of polymer. Three parts by weight are usually sufficient. When a zinc salt of an oxyacid such as zinc borate is being used, the zinc oxide may be omitted from the composition and correspondingly larger proportions of the zinc salt may be used.

To illustrate the advantages obtainable by using the retarders of our invention, the following compositions were prepared:

| Composition | 1 | 2 | 3 | 4 | 5 |
|---|---|---|---|---|---|
| Neoprene | 100 | 100 | 100 | 100 | 100 |
| Magnesia | 10 | 10 | 10 | 10 | 10 |
| Phenyl-beta-naphthyl amine | 2 | 2 | 2 | 2 | 2 |
| Carbon black | 100 | 100 | 100 | 100 | 100 |
| Rosin oil | 10 | 10 | 10 | 10 | 10 |
| Zinc oxide | 5 | 5 | 5 | 0 | 5 |
| Sodium silicate | | | 3 | | |
| Trisodium phosphate | | | | 3 | |
| Zinc borate | | | | | 6.4 |
| Lead silicate | | | | | 3 |

Samples of each composition were kept in an oven for 8 hours at 158° F., and the percent loss in plasticity was calculated.

| | Percent loss in plasticity | | | | |
|---|---|---|---|---|---|
| Composition | 1 | 2 | 3 | 4 | 5 |
| 8 hrs. at 158° F | 99 | 12 | 18 | 64 | 68 |

Samples of each composition were cured for 45 minutes, and all developed tensile strengths of over 1000 lbs./sq. in. in 45 minutes at 287° F. Although compositions containing the retarders of this invention are relatively stable at 150° F., at curing temperatures they develop tensile strengths comparable to those developed by compositions containing no retarder.

Any of the retarders within the scope of this invention may be similarly employed in any neoprene composition whether or not they contain pigments, fillers, softeners, or antioxidants. If the neoprene is in the form of a solution or dispersion, the retarder may be simply dissolved or suspended therein, the retarder may be incorporated into a solid composition by milling or by mastication in an internal mixer.

Compositions containing retarders may be vulcanized by the ordinary methods, i. e. in a mold, in open steam, or in hot air.

Although we have herein disclosed specific embodiments of our invention, we do not intend to limit ourselves solely thereto, for it will be obvious that many modifications such as the substitution of equivalent materials and variation of proportions used are within the scope of the invention as defined in the appended claims.

We claim:

1. The process which comprises vulcanizing neoprene in the presence of an alkali metal silicate.

2. The process which comprises vulcanizing neoprene in the presence of zinc oxide and sodium silicate.

3. A neoprene composition which has been vulcanized in the presence of an alkali metal silicate.

4. A neoprene composition which has been vulcanized in the presence of sodium silicate.

ROBERT V. YOHE.
ARTHUR W. BROWNE.